US006412344B1

(12) United States Patent
Danicich et al.

(10) Patent No.: US 6,412,344 B1
(45) Date of Patent: Jul. 2, 2002

(54) FLUID LEVEL SENSOR WITH DRY COUPLANT

(75) Inventors: Jeffrey P. Danicich, Savage; Eric D. Haugen, Farmington; Greg A. Seidel, St. Paul; Charles G. Huss, Shakopee; Derrick D. Hongerholt, Eagan, all of MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 09/440,533

(22) Filed: Nov. 15, 1999

(51) Int. Cl.⁷ .............................................. G01F 23/28
(52) U.S. Cl. .................................................. 73/290 V
(58) Field of Search .......................... 73/290 V, 290 B, 73/597, 290 R; 367/908, 87, 157, 159, 162, 163, 165; 340/621, 618

(56) References Cited

U.S. PATENT DOCUMENTS

| | | | |
|---|---|---|---|
| 3,744,301 A | 7/1973 | Arave | 73/67.6 |
| 4,019,373 A * | 4/1977 | Freeman et al. | 73/194 A |
| 4,063,457 A | 12/1977 | Zekulin et al. | 73/290 V |
| 4,107,994 A * | 8/1978 | Sogo | 73/290 V |
| RE29,785 E | 9/1978 | Leschek et al. | 310/327 |
| 4,144,517 A | 3/1979 | Baumoel | 340/1 L |
| 4,203,324 A * | 5/1980 | Baumoel | 73/290 V |
| 4,221,004 A | 9/1980 | Combs et al. | 367/114 |
| 4,242,744 A | 12/1980 | Rottmar | |
| 4,572,253 A | 2/1986 | Farmer et al. | 141/95 |
| 4,700,569 A * | 10/1987 | Michalski et al. | 73/290 V |
| 4,901,245 A | 2/1990 | Olson et al. | |
| 4,934,191 A | 6/1990 | Kroening et al. | 73/592 |
| 4,958,518 A | 9/1990 | Duenstl et al. | 73/290 V |
| 4,984,449 A | 1/1991 | Caldwell et al. | 73/49.2 |
| 5,189,911 A * | 3/1993 | Ray et al. | 73/290 V |
| 5,195,058 A * | 3/1993 | Simon | 367/87 |
| 5,201,222 A | 4/1993 | Johnson | |
| 5,249,466 A | 10/1993 | Jones | 73/633 |
| 5,303,585 A | 4/1994 | Lichte | 73/290 V |
| 5,319,973 A | 6/1994 | Crayton et al. | |
| 5,456,114 A | 10/1995 | Liu et al. | 73/597 |
| 5,664,456 A * | 9/1997 | Eckert | 73/290 V |
| 5,691,476 A | 11/1997 | Madaras | 73/644 |
| 5,697,248 A | 12/1997 | Brown | 73/290 V |
| 5,730,025 A * | 3/1998 | Getman et al. | 73/290 V |
| 5,770,801 A | 6/1998 | Wang et al. | 73/644 |
| 5,900,546 A | 5/1999 | Wilkins | 73/290 V |
| 5,929,338 A | 7/1999 | Frankel et al. | 73/602 |
| 5,948,979 A * | 9/1999 | Fitsch et al. | 73/290 V |

FOREIGN PATENT DOCUMENTS

| | | |
|---|---|---|
| DE | 9321132 | 12/1993 |
| EP | 0769684 | 4/1997 |
| EP | 0955529 | 11/1999 |

OTHER PUBLICATIONS

"Use of Couplant and Membranes" from Nondestructive Testing Handbook (Second Edition), vol. 7, "Ultrasonic Testing", Edited by Birks, Green, Jr. and McIntire, p. 211, 1991.

* cited by examiner

Primary Examiner—Helen Kwok
(74) Attorney, Agent, or Firm—Thompson Hine LLP

(57) ABSTRACT

A sensor for measuring the height of fluid in a vessel, the sensor including a mounting base shaped to be coupled to an exterior surface of a vessel. The sensor further includes a transducer having a pulse source for sending pulses into the vessel and an echo detector for detecting echoes of pulses emitted by the pulse source. The sensor further has a dry couplant located between the transducer and the mounting base, and a processor connected to the transducer for calculating the height of fluid in the vessel based at least in part upon the time elapsed between the pulses sent by the transducer and echoes detected by the echo detector.

43 Claims, 5 Drawing Sheets

FLUID LEVEL SENSOR WITH DRY COUPLANT

BACKGROUND OF THE INVENTION

The present invention is directed to a sensor for measuring the level of fluid in a vessel, and more particularly, to a sensor for measuring the level of fluid in a vessel by emitting and detecting ultrasonic pulses.

When vessels or tanks are used to contain a fluid, such as water, it is desirable to know the level or height of fluid in the vessel in order to determine the volume of fluid remaining in the vessel. There are many prior art fluid level sensors that determine the level of fluid in a vessel. However, most existing fluid level sensors are "intrusive," which require a sensor to be located inside the vessel. Because the intrusive fluid level sensors are located inside the vessel, the sensors are difficult to mount and may be difficult to access for replacement or repair. Intrusive fluid level sensors are also exposed to the contents of the vessel and pressure inside the vessel, which can be hazardous to the sensor, and the sensor may contaminate the contents of the vessel. Finally, some intrusive fluid level sensors require holes to be drilled in the vessel, which adds additional time and expense to the mounting procedure, and compromises the integrity of the vessel.

Non-intrusive fluid level sensors may be used in place of intrusive fluid level sensors. The non-intrusive fluid level sensors may use a transducer to send ultrasonic pulses through the vessel and detect the reflection of the emitted pulses (an echo pulse) that is generated when the ultrasonic pulses reach a fluid-air (or fluid-gas) interface in the vessel. By measuring the elapsed time between the emission of the original pulse and the detection of the reflected pulse, and knowing the speed of travel of the pulses in the vessel, the level of fluid in the vessel may be determined.

In order to couple the transducer to the walls of the vessel such that the transducer can transmit ultrasonic pulses through wall of the vessel, a couplant must be used. Typically, a "wet" couplant, which is a gel or liquid, is used to couple the transducer to the vessel wall. However, wet couplants can be difficult to handle and to contain inside the sensor. Wet couplants increase the difficulty of mounting and replacing a non-intrusive level sensor because the wet couplant may tend to leak or escape when the sensor is unassembled. Furthermore, a wet couplant has a natural tendency to lose moisture, and thus may dehydrate or dry out over time. Accordingly, there is a need for a non-intrusive fluid level sensor which is easy to mount and service, and which reduces the adverse effects associated with the use of wet couplants.

SUMMARY OF INVENTION

The present invention is a non-intrusive fluid level sensor which utilizes a dry couplant. The fluid level sensor of the present invention is easy to couple to, and decouple from, the vessel, which makes the sensor easy to mount and service. The sensor uses a dry couplant which resists dehydration. In a preferred embodiment, the invention is a sensor for measuring the height of fluid in a vessel, the sensor including a mounting base shaped to be coupled to an exterior surface of a vessel. The sensor further includes a transducer having a pulse source for sending pulses into the vessel and an echo detector for detecting echoes of pulses emitted by the pulse source. The sensor further has a dry couplant located between the transducer and the mounting base, and a processor coupled to said transducer for calculating the height of fluid in said vessel based at least in part upon the time elapsed between the pulses sent by said transducer and echoes detected by said echo detector.

Accordingly, it is the object of the present invention to provide a fluid level sensor that is easy to mount and service, and which resists the adverse effects associated with wet couplants.

Other objects and advantages of the present invention will be apparent from the following description and the accompanying drawings.

DETAILED DESCRIPTION

Figure 1:
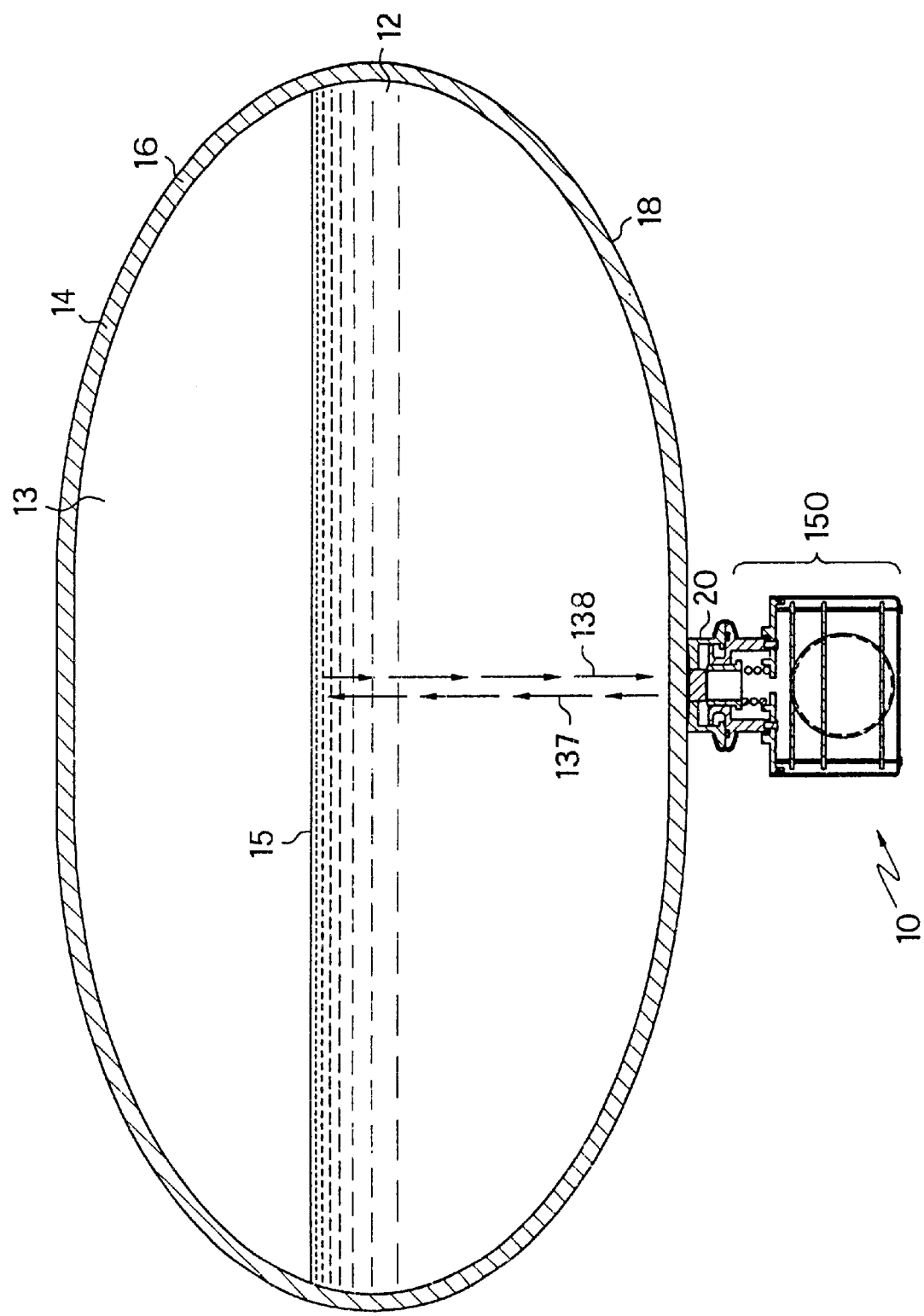
FIG. 1 is a side cross section of one embodiment of the fluid level sensor of the present invention, shown attached to a vessel.
Figure 2:
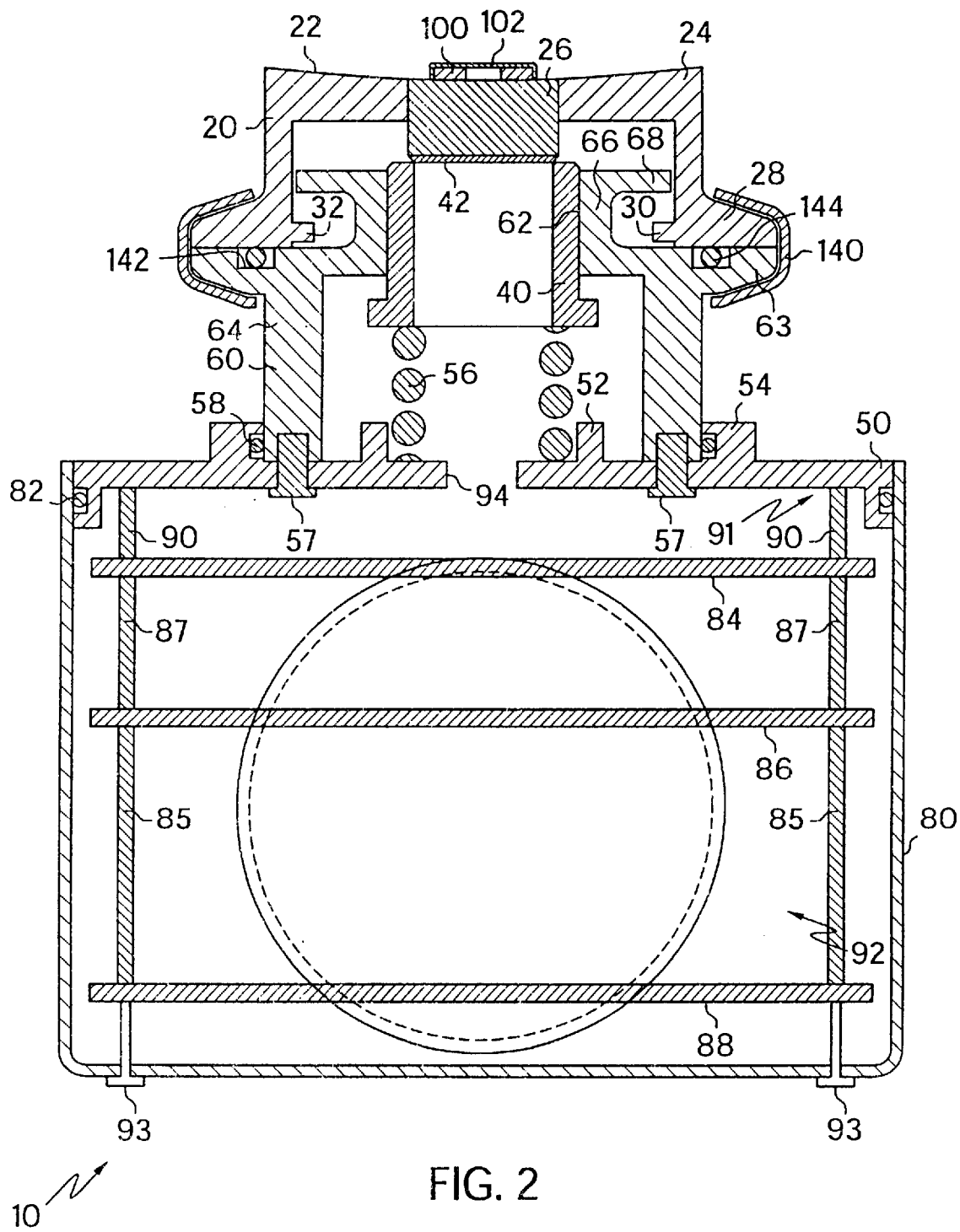
FIG. 2 is a detail cross section of the sensor of FIG. 1.

As shown in FIG. 1, the present invention is a fluid level sensor, generally designated 10, used to measure the level of fluid 12 in a vessel 14. A gas 13, such as air, is located above the fluid 12, and the gas 13 and fluid 12 form a fluid-gas interface 15. The vessel 14 has an outer wall 16 which contains the fluid 12, the outer wall 16 having an exterior surface 18. The sensor 10 includes a mounting base 20 that is shaped to be attached to the exterior surface 18. As shown in FIG. 2, the face 22 of the mounting base 20 is curved to match the curvature of the exterior surface 18. The mounting base 20 may be coupled to the exterior surface 18 of the vessel 14 by an adhesive, and is preferably bonded such that there are generally no air gaps between the mounting base 20 and the exterior surface 18.

As shown in FIG. 2, the mounting base 20 includes an outer ring portion 24 that is preferably made of metal and a generally cylindrical transition portion 26, also known as a "wedge," located inside the ring portion. The transition portion 26 is preferably made of a material that is thermally and acoustically compatible with the wall 16 of the vessel 14, and preferably has an impedance that allows acoustic pulses (such as ultrasonic pulses) to travel through the transition portion 26 with minimal loss. Although not shown in FIG. 2, the outer ring portion 24 may be made from the same material as the transition portion 26, and thus the mounting base 20 may be made of a single, unitary material.

Figure 3:
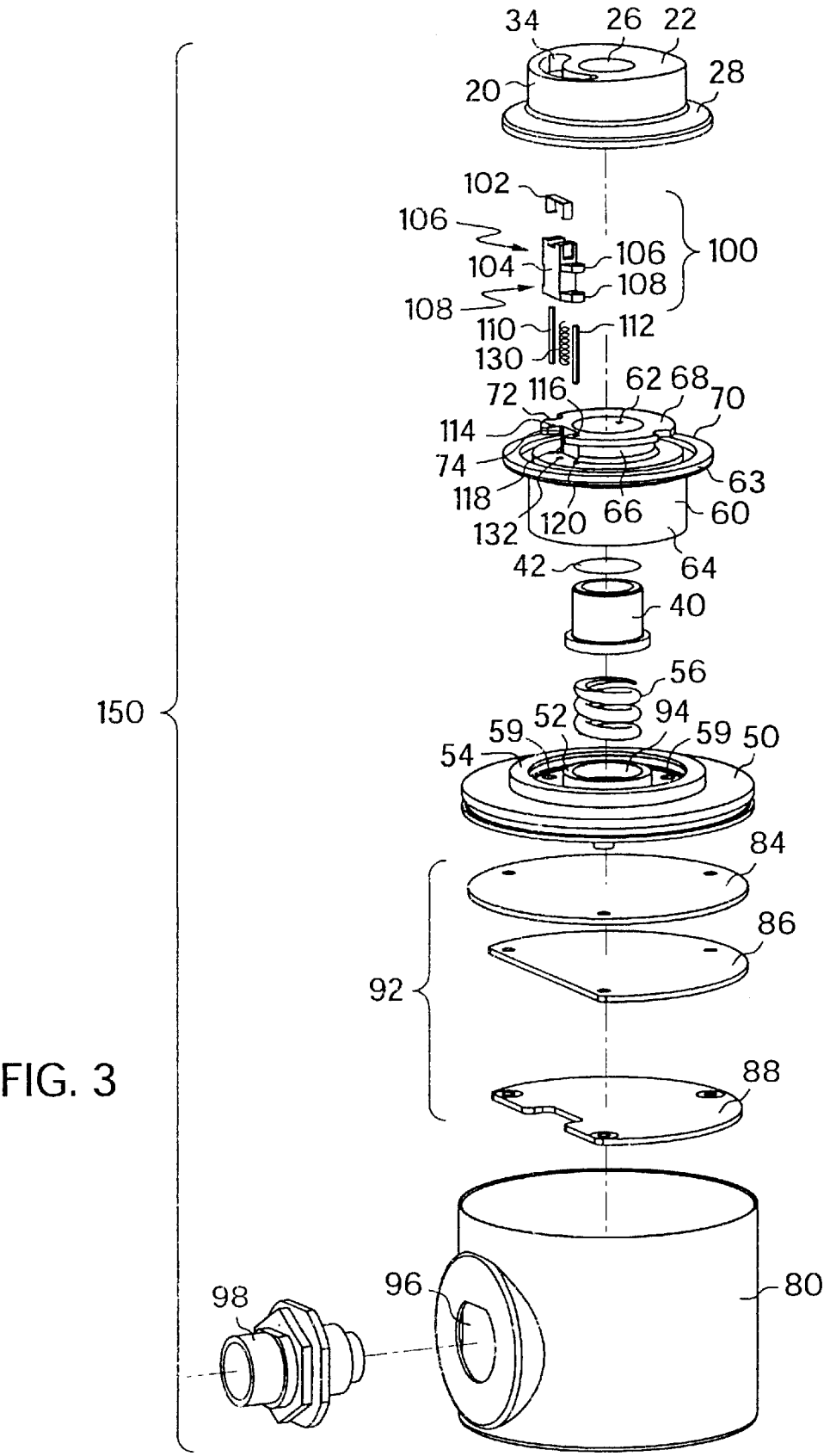
FIG. 3 is an exploded perspective view of the sensor of FIG. 1.
Figure 6:
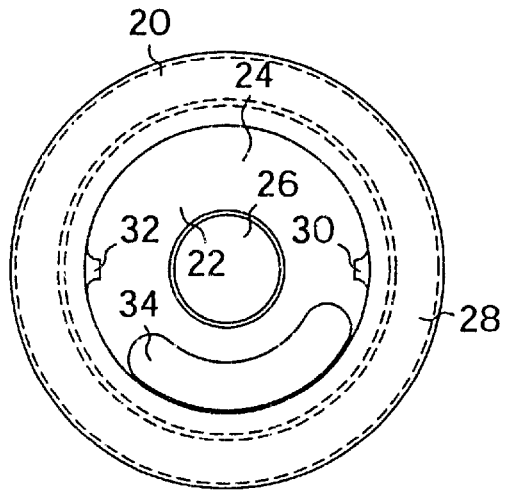
FIG. 6 is a bottom view of the mounting base of the sensor of FIG. 1.

The mounting base 20 has a generally circumferentially extending temperature sensor aperture 34 formed in the outer ring portion 24 (FIGS. 3 and 6). In the illustrated embodiment, the temperature sensor aperture 34 is generally "arcuate," or "kidney"-shaped. The mounting base 20 also includes a radially outwardly extending mounting flange 28, and a pair of radially inwardly extending flanges 30, 32 (FIGS. 2 and 6).

The sensor 10 further includes a transducer 40 having a pulse source (not shown) that generates elastic wave pulses (such as ultrasonic pulses) and an echo detector (not shown) that detects elastic wave pulses (such as ultrasonic pulses). As used herein, the term "transducer" refers to a device that is capable of transmitting and/or receiving elastic or ultrasound pulses. The transducer typically uses a piezoelectric element to send out wave pulses and to detect wave pulses. Transducers are typically either "single type" and "array type" transducers. A "single type" transducer has a single ultrasound transducer while an "array type" transducer has a plurality of ultrasound transducers arranged either in a line or in a matrix array. Both single and array type transducers, as well as other types of transducers, can be used in the present invention.

A dry or solid coup ant 42 is located between the transducer 40 and the transition portion 26 of the mounting base 20. The dry couplant 42 is made of a material that transmits elastic pulses (such as ultrasonic pulses) with relatively little interference. The dry couplant 42 acts as a "conductor" to transfer ultrasonic pulses between the transducer 40 and transition portion 26. That is, the dry couplant 42 helps to bridge the impedance mismatch between the face of the transducer 40 and the transition portion 26 of the mounting base 20, as well as eliminating any air gaps between the transducer and the mounting base. The dry couplant 42 may be made from a wide variety of materials including, but not limited to, elastomers, rubber, or compliant, encapsulated epoxy materials. The dry couplant 42 is preferably made of a rubber-like material sold under the name AQUALENE™ sold by Materials Research Institute of Ontario, Canada, or RO-CEE RUBBER™ sold by NDT International of West Chester, Pa.

The transition portion 26 of the mounting base 20 is preferably made of a material that acoustically "matches," or is compatible with, the dry couplant 42 in terms of propagation of ultrasonic wave energy. The transition portion 26 also is preferably acoustically compatible with the material of the wall 16 of the vessel 14. In this matter, the transition portion 26 acts as a "transition" material to guide pulses from the dry couplant 42 to the vessel wall 16. The transition portion 26 is preferably made of a polymer, such as nylon, acrylic, or polycarbonate, although other materials such as metals, ceramics, or others may be used without departing from the scope of the invention.

The sensor 10 includes a support 50 having an inner annular wall 52 and an outer annular wall 54. A transducer spring 56 is located between the transducer 40 and the support 50, and the transducer spring 56 is located adjacent, and radially inwardly of, the inner annular wall 52. The transducer spring 56 biases the transducer 40 against the dry couplant 42, and the dry couplant 42 is in turn biased against the transition portion 26 of the mounting base 20. In this manner, the transducer 40, dry couplant 42, and mounting base 20 are pressed together to ensure a tight fit between those components. The tight fit helps to ensure that there are no air gaps between the components and ensures that acoustic pulses are transferred between the transducer 40, dry couplant 42, and mounting base 26.

The transducer 40 must be biased against the dry couplant 42 with a significant pressure, for example around 500 psi, in order to ensure proper contact between the transducer and the dry couplant, and between the dry couplant 42 and the transition portion 26. The pressure exerted on the transducer 40 is preferably generally constant in order to ensure proper contact. However, in other areas of technology in which dry couplants may be used, the dry couplants are often biased into contact with a transducer by a nut or other similar means. However, a biasing nut may experience thermal expansion or contraction, which can vary the force exerted by the nut onto the dry couplant. In contrast, the transducer spring 56 of the present invention applies a generally constant force on the transducer 40 over a wide range of temperatures.

Figure 5:
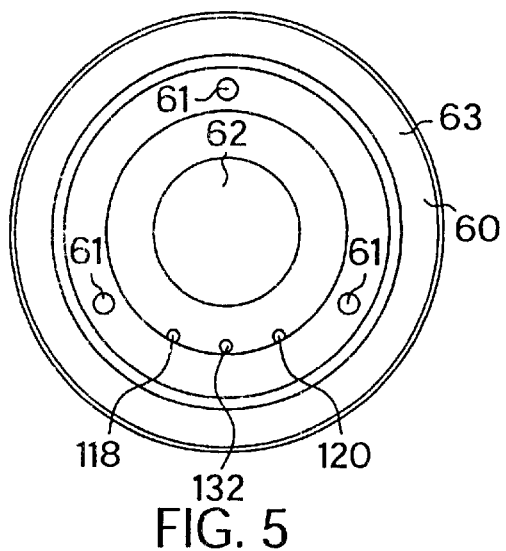
FIG. 5 is a bottom view of the transducer guide of FIG. 4.
Figure 7:
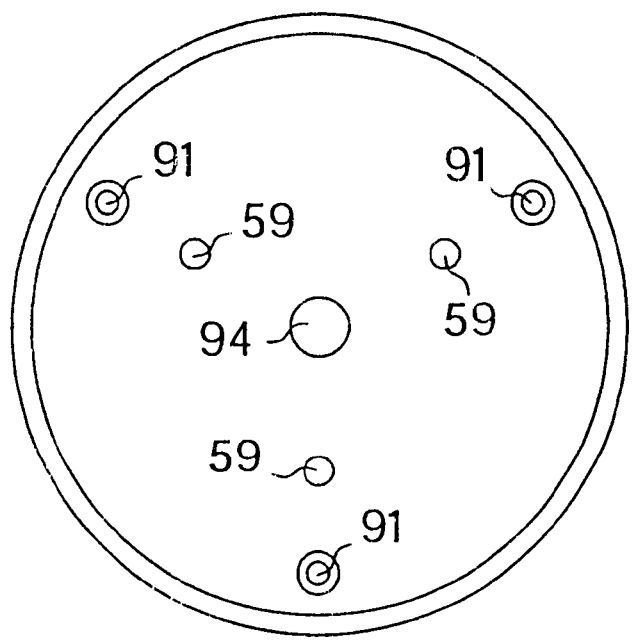
FIG. 7 is a bottom view of the support of the sensor of FIG. 1.
Figure 8:
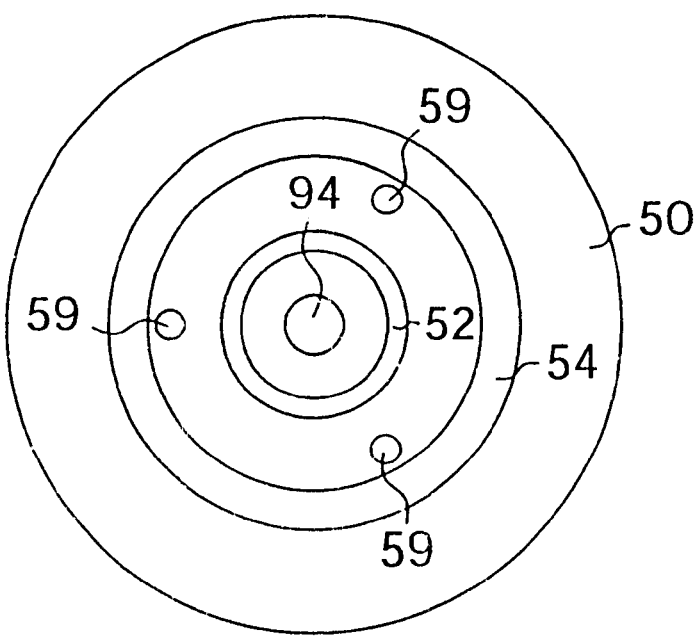
FIG. 8 is a top view of the support of FIG. 7.

The sensor 10 includes a transducer guide 60 that has a central aperture 62 sized to closely receive the transducer 40. The transducer guide 60 receives the transducer 40 and helps to center and locate the transducer 40 in the desired location such that the transducer properly engages the dry couplant 42 and transition portion 26. The transducer guide 60 is located adjacent, and radially inwardly of, the outer annular wall 54 of the support 50. An "O"-ring 58 is located between the transducer guide 60 and the outer annular wall 54. The transducer guide 60 is attached to the support 50 by a set of screws 57 that pass through a set of holes 59 in the support 50 (FIGS. 7 and 8) and through a set of holes 61 on the bottom surface of the transducer guide 60 (FIG. 5).

Alternately, the transducer guide 60 may be integral with the support 50. In this case, sensor 10 may include a retaining ring (not shown) or other retaining device on the upper side the transducer (with reference to FIG. 2) to allow the transducer to be placed into, and removed from, the unitary transducer guide/support. The retaining ring may be removable to allow the transducer 40 to be placed into the transducer guide 60. Once the transducer is received in the central aperture 62 of the transducer guide 60, the retaining ring is placed into its locking position to hold the transducer 40 in place in the sensor 10. The retaining ring thus enables the transducer 40 to be placed into, and retained in, the sensor 10. Alternately, the sensor may include a removable cap (not shown) or other retaining device located beneath the transducer spring 56. The cap may be removable to allow the transducer 40 and transducer spring 56 to be placed into the aperture 62 of the transducer guide 60, and the cap holds the transducer 40 and transducer spring 56 in place when the cap is placed into its locking position on the sensor 10. The cap thus enables the transducer 40 and transducer spring 56 to be placed into, and retained in, the sensor 10 when the transducer guide and support are formed as a single piece.

Figure 4:
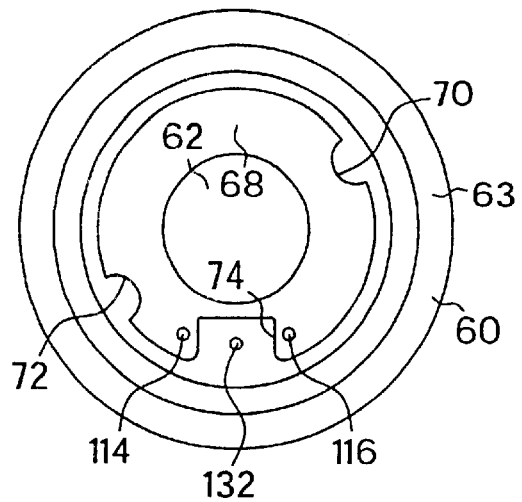
FIG. 4 is a top view of the transducer guide of the sensor of FIG. 1.

The transducer guide 60 includes a body portion 64 and an axially extending neck portion 66 extending from the body portion. A rim portion 68 extends radially outwardly from the neck portion 66. The transducer guide 60 also includes a mounting flange 63 extending radially outwardly from the body portion 64. As best shown in FIG. 4, the rim portion 68 includes a pair of notches 70, 72 and a temperature sensor notch 74.

The support 50 is located inside a "cup"-shaped casing 80 (FIG. 3), and an O-ring 82 (FIG. 2) is located between the support 50 and the casing 80. A set of circuit boards 84, 86, 88 are located in the casing 80. The circuit boards 84, 86, 88 together comprise a processor 92 that can receive and process data from the various components of the sensor, send data or commands to an outside processor, and receive and process data or commands from an outside processor. Of course, a wide variety of processors may be used without departing from the scope of the invention, and the circuit boards 84, 86, 88 illustrate only a single processor that may be used in the present invention.

A set of lower spacers 85, or stand-offs, are located between the circuit board 88 and the circuit board 86. A set of middle spacers 87 are located between the circuit board 86 and the circuit board 84, and a set of upper spacers 90 are located between the circuit board 84 and the support 50. Each lower spacer 85 extends at least partially through the circuit board 86 and is threaded into an associated middle spacer 87. Each middle spacer 87 extends at least partially through the circuit boards 84, 86, and is in threaded into an associated upper spacer 90. Each upper spacer 90 is threaded into an associated hole 91 in the support 50 (see FIG. 7) to couple the circuit boards 84, 86, 88 to the support 50. A set of screws 93 are passed through the bottom of the casing 80 and received in the lower spacers 85 to couple the circuit boards 84, 86, 88 and the support 50 to the casing 80. The spacers 85, 87, 90 couple the circuit boards 84, 86, 88 together and maintain the spacing between the circuit boards. The casing 80, the transducer guide 60, the outer ring portion 24 of the mounting base 20 and the support 50 are all preferably made of a light weight material, including but not limited to polymers and metals.

The transducer 40 is coupled to the processor 92 by a set of wires or electrical paths (not shown) that extend through the center opening 94 of the support 50. The casing 80 includes a side aperture 96 (FIG. 3), and a wire or wires extend from the processor 92 into the side aperture. The side aperture 96 is shaped to receive a socket 98 that can receive an external plug. In this manner, an external plug that is received in the socket 98 can be coupled to the processor 92 via the wire or wire (or other electrical paths) received in the socket. An external plug can also be attached by other means such as a flex circuit or circuit board. In a preferred embodiment, the socket 98 includes a socket insert (not shown) that electrically couples the wires from the circuit boards 84, 86, 88 to an external plug. The socket insert may be a socket insert model Miniature Cylindrical MIL-C-26482, Series 2 (Mil Spec MS3474), manufactured and sold by Amphenol Corporation Amphenol Aerospace of Sidney, N.Y., although a wide variety of socket inserts may be used.

The sensor 10 includes a temperature sensor, generally designated 100 (FIG. 3). The temperature sensor 100 is received in a temperature sensor notch 74 in the transducer guide 60. The temperature sensor 100 includes a thermocouple (not shown) that is mounted on a temperature sensor support 102. Alternately, a thermistor, a resistance temperature device ("RTD"), or other component used to measure temperature may be located on the temperature sensor support 102 in place of the thermocouple. The temperature sensor support 102 is a relatively thin piece of material, such as aluminum. The shape and material of the temperature sensor support 102 ensure that the temperature sensor support 102 has a low thermal mass, and can thereby quickly react to changes in temperature. A thermally conductive material (not shown) may be located between the temperature sensor support 102 and the wall 16 of the vessel to improve heat conduction from the wall 16 to the temperature sensor support and the thermocouple. The temperature sensor support 102 is formed in a generally "staple" shape, and is coupled to a temperature sensor base 104 by a tension fit, an adhesive, or other means.

The temperature sensor base 104 includes an set of opposed upper arms 106 and a set of opposed lower arms 108 located on each side of the base, each arm 106, 108 having a hole (not shown) extending through the arm. The temperature sensor base 104 is coupled to the transducer guide 60 by a pair of pins 110, 112 that are passed through the holes in the arms 106, 108. The pins 110, 112 are preferably spring pins that can be compressed radially inwardly (i.e. the pins can effectively reduce their diameter). The body portion 64 of the transducer guide 60 and the rim portion 68 of the transducer guide 60 each include a pair of pin-receiving holes 114, 116, 118, 120 (See FIGS. 3–5).

In order to mount the temperature sensor 100 to the transducer guide 60, pin 110 is passed through the arms 106, 108 on one side of the temperature base 104. The pin 112 is then passed through the holes in the arms 106, 108 on the opposite side of the support 104. The pin 110 is then forced into the holes 114, 118, and the pin 112 is forced into the holes 116, 120. The holes 114, 116, 118, 120 preferably have a diameter slightly smaller than the diameter of the uncompressed pins 110, 112. In this manner the pins 110, 112 are radially compressed when received in the holes 114, 116, 118, 120 and are thereby retained in the holes by the spring forces in the pins. It should be understood that this structure for attaching the temperature sensor 100 to the transducer guide 60 illustrates only one of a number of possible methods for attaching the temperature sensor to the transducer guide, and various other manners of attaching the temperature sensor to the transducer guide may be used without departing from the scope of the present invention.

A temperature sensor spring 130 is located between the temperature sensor base 104 and the body portion 64 of the transducer guide 60 to bias the temperature sensor 100 away from the body portion. As shown in FIG. 2, when fully assembled the temperature sensor 100 protrudes slightly beyond the face 22 of the mounting base 20. However, when the sensor 10 is pressed against the exterior surface 18 of the vessel 14, the temperature sensor spring 130 is compressed, and the temperature sensor 100 is pressed flush with the face 22 of the mounting base 20. The arms 106, 108 of the temperature sensor base 104 slide along the pins 110, 112 as the temperature sensor base 104 compress the temperature sensor spring 130. A wire, set of wires or other electrical paths (not shown) couple the temperature sensor 100 to the processor 92. As shown in FIG. 4, the transducer guide 60 includes a wire hole 132 through which the wire from the temperature sensor 100 can be passed. In this manner, the processor 92 can receive and process inputs from the temperature sensor 100.

In order to operate the fluid level sensor 10, the sensor is attached to the vessel 14 as described above and shown in FIG. 1. The transducer 40 is then triggered to emit a pulse of acoustic energy, preferably at an ultrasonic frequency. When the transducer 40 emits a pulse, the pulse is coupled to, or transmitted to, the transition portion 26 of the mounting base 20 by the dry couplant 42. Because the transducer 40, dry couplant 42 and transition portion 26 are urged in close contact by the transducer spring 56, little energy is lost during transmission of the pulse through those components. Furthermore, as noted earlier, the materials of the dry couplant 42 and the transition portion 26 are selected to ensure a high efficiency transfer of the pulse. The emitted pulse then passes through the wall 16 of the vessel and enters the fluid 12 in the vessel (the emitted pulse is shown schematically as pulse 137 in FIG. 1). The pulse 137 then propagates through the fluid 12 until the fluid-gas interface 15 is reached. Because of the acoustic impedance difference between the gas 13 and the fluid 12, a reflected wave pulse, or "echo" is generated at the fluid-gas interface 15, shown schematically as pulse 138. The echo wave, or acoustic pulse 138 travels in the opposite direction to the pulse 137 emitted by the transducer 40. The reflected pulse 138 then travels through the fluid 12, and through the wall 16 of the vessel 14, the mounting base 20, and the dry couplant 42. The echo pulse 138 is then sensed by the transducer 40.

By measuring the time elapsed from the sending of the pulse 137 to the receipt of the echo 138, and knowing: 1) the speed of travel of the pulses through the fluid 12; 2) the speed of travel of the pulses through the vessel wall 16; 3) the thickness of the vessel wall; 4) the speed of travel of the pulses through the transition portion 26; and 5) the thickness of the transition portion, the height of the fluid 12 in the vessel 14 can be calculated. The height of the fluid 12 can be calculated by first determining the total elapsed time between the emission of the pulse and the receipt of the echo signal. The time that the pulse and echo take to travel through the vessel wall 16 and the transition portion 26 is known, or can be calculated by the processor 92. The time for the pulses to travel through the vessel wall 16 is the speed through which a pulse travels through the vessel wall (empirically known or calculated) multiplied by thickness of the wall (known or measured). The time to travel through the transition portion 26 is the speed through which a pulse travels through the transition portion (empirically known or calculated) multiplied by the thickness of the transition portion (known or measured). The time for the pulses to travel through the dry couplant may also be considered, but due to its relatively thin nature this may generally be disregarded.

Once the time that it takes the emitted pulse and the echo pulse to travel through the vessel wall 16 and the transition portion 26 is calculated, that time value is subtracted from the total time from the emission of the emitted pulse to the detection of the echo pulse. The resultant value is then multiplied by the speed of the travel of the pulses through the fluid 12, and divided by two, to arrive at the height of the fluid in the vessel 14. The speed of the travel of pulses through the fluid 14 may be programmed into the processor 92. In one embodiment, the processor 92 simply measures the time elapsed between the emission of the pulse and the detection of the echo. This data is then transferred to an external processor that calculates the height of the fluid, and/or the volume of fluid in the vessel. In another embodiment, the processor 92 may calculate the height of the fluid 12 and/or the volume of fluid in the vessel 14. Finally, the processor 92 may be located remotely from the transducer 40 and the associated hardware for coupling the transducer to the vessel. In other words, the processor 92 need not be mechanically coupled or connected to the casing 80, support 50, transducer guide 60, or mounting base 20, but is preferably coupled (i.e. electrically coupled) to the transducer 40 and temperature sensor 100 to receive outputs from those components.

Because the temperature sensor 100 is thermally coupled to the wall 16 of the vessel 14 and is electronically coupled to the processor 92, the temperature of the fluid 12 in the vessel 14 can be taken into account when determining the speed of travel of pulses through the fluid. Thus, the sensor 10 of the present invention may use temperature compensation to account for variations in the speed of travel of ultrasonic waves through the fluid 12 as a function of temperature. Accordingly the processor 92 can account for a wide variety of variables, including the viscosity of fluid 12, time of travel of the pulses through the wall of the vessel 16, the time of travel of the pulses through the components of the sensor 10, and the temperature of the vessel 14 and of the fluid 12.

Temperature changes of the fluid 12 inside the vessel 14 are relatively quickly transmitted to the walls 16 of the vessel. Because the temperature support 102 is made of thin metal, it has a very low thermal mass and thus quickly assumes the temperature of the wall 16. Because of the reduced thermal mass of the temperature support 102, the change in temperature is quickly sensed by the thermocouple. In this manner, the fluid temperature can be accurately monitored, and any changes in the temperature of the fluid 12 are quickly detected.

Once the height or level of the fluid 12 is known, the volume of fluid in the vessel 14 may be calculated using any number of varying techniques. For example, if the vessel's exact configurations and dimensions are known, the volume of fluid in the vessel 14 can be calculated by mathematical equations. Alternately, the volume of liquid in the vessel 14 can be determined by a look-up table that is created either empirically or mathematically.

The sensor 10 may be modified to be located on a side of the vessel 14, as long as its position on the vessel 14 is known (i.e., the sensor's height above the bottom of the vessel must be known). However, the sensor 10 preferably remains below the fluid-gas interface 15. If the sensor 10 were to be located above the fluid-gas interface 15, the acoustic pulses emitted by the transducer 40 would largely be reflected away from the wall 16 of the vessel. Furthermore, the transducer preferably sends the ultrasonic waves in a direction perpendicular to the fluid-gas interface 15. Thus, if the sensor 10 is located along the side of the vessel, the vessel may include a flat that is parallel to the fluid-gas interface 15, and the sensor is preferably attached to the flat. Alternately, if the sensor cannot be located such that the ultrasonic waves are emitted in a direction perpendicular to the fluid-gas interface, this can be accounted for in the materials of the transition portion. The materials of the transition portion 26 may be selected such that the refraction of the emitted and echo pulses, when the pulses enter or exit the vessel, is reduced.

A variety of false "echo" signals may be generated as an emitted pulse travels through the sensor 10 and the vessel 14. However, the processor 92 may be programmed to disregard the false signals. For example, the processor 92 may be programmed to have a "window," or a range of time, during which it expects to receive the echo signal generated by the fluid-gas interface 15. The signals received outside of this window may be disregarded as false echo signals. Furthermore, the processor 92 may be programed to test for transducer failure, or to determine when the sensor 10 becomes detached from the vessel 14. To determine whether the sensor 10 has become detached, the sensor 10 periodically checks to verify that ultrasonic energy is coupled to the exterior surface 18 of the vessel 14. This is determined by monitoring the "false" echoes that are generated when the emitted ultrasonic waves reach the mounting base and the exterior surface 18. Changes in the amplitude of these "false" echoes indicate that the sensor 10 may have become detached from the vessel 14.

The processor 92 may also be programed to account for tilt of the vessel 14. For example, if the vessel 14 were mounted onto an airplane, the pitch, roll, or yaw of the aircraft can displace the fluid 12 in the vessel 14, and cause inaccurate level readings if the tilt is not accounted for by the processor 92 (especially if the sensor 10 is not mounted at the center of the tank). However, the amount of pitch, roll, or yaw of the aircraft may be measured by a tilt sensor and fed to the processor 92. The processor 92 may then use a compensation chart to adjust the readings it receives from the transducer 40 to account for the tilt of the vessel 14 when determining the level of fluid in the vessel.

When there is relatively high tilt of the vessel, the pulse emitted by the pulse source may be reflected away from the sensor by the fluid-gas interface 15 such that the echo pulse is not received by the transducer. In other words, the fluid-gas interface may form a non-perpendicular angle with the emitted pulse such that the resultant, reflected echo pulse is directed away from the sensor. In order to address this issue, the beam spread of the emitted pulse may be increased. By increasing the beam spread of the emitted pulse, the beam spread of the echo pulse is also correspondingly increased. Because the beam spread of the echo pulse is increased, the echo pulse is spread over a wider area, and the echo pulse can be received by the transducer over a wider range of tilt of the vessel. The beam spread of the emitted pulse can be increased by decreasing the frequency of the emitted pulse and decreasing the diameter of the crystals in the transducer. This achieves a broad beam pattern of the emitted pulse and echo pulse, which ensures that the echo pulse can be sensed by the transducer over a greater range of tilt of the vessel.

When the pulse source and the echo detector share the same piezoelectric element in the transducer 40, the pulses emitted by the pulse source excite the piezoelectric element in a phenomenon known as "ringing". During normal operation, the ringing of the piezoelectric element has substantially decreased by the time the echo pulse created by the fluid-air interface 15 arrives back at the echo detector, and therefore ringing does not present a serious problem under normal operating conditions. However, when the level of fluid 12 in the vessel 14 is relatively low, less time elapses between the emission of a pulse and the detection of the echo. In this case the piezoelectric element may still be ringing when the echo pulse reaches the echo detector, which can reduce the accuracy of the sensor. In order to address this effect, the pulse source and the echo detector of the transducer 40 may have separate piezoelectric elements to reduce the ringing of the echo detector. By using separate piezoelectric elements for the pulse source and for the echo detector, the pulse source and the echo detector are sonically isolated, or sonically decoupled, from each other. This ensures that there is no residual activation of the echo detector when an echo pulse is detected by the echo detector. This, in turn, increases the accuracy of the sensor 10 when there are low levels of fluid 12 in the vessel 14.

The sensor 10 is designed such that it is relatively easily assembled and attached to the vessel 14, and is easily detached and replaced should replacement or repair of the sensor 10 be necessary. In order to attach the sensor 10 to the vessel 14, the mounting base 20 is first adhered to the exterior surface 18 of the vessel 14. As noted earlier, the mounting base 20 is preferably bonded to the exterior surface 18 such that there are generally no air gaps between the mounting base 20 and the exterior surface. The casing 80, circuit boards 84, 86, 88, support 50, and transducer guide 60 are preferably coupled together in the manners described earlier. For example, the support 50 is coupled to the casing 80 by the spacers 85, 87, 90 and the screws 93, and the transducer guide 60 is coupled to the support 50 and casing 80 by screws 57. The temperature sensor 100 is coupled to the transducer guide 60 by the pins 110, 112. The transducer 40 and transducer spring 56 are then passed through the central aperture 62 in the transducer guide 60. The dry couplant 42 is then located on the end of the transducer 40. Next, the entire lower assembly 150, which includes the casing 80, processor 92, support 50, transducer spring 56, transducer 40, transducer guide 60, temperature sensor 100 and dry couplant 42 is lifted toward the mounting base 20 to attach the lower assembly 150 (see FIG. 1) to the mounting base 20.

In order to attach the lower assembly 150 to the mounting base 20, the notches 70, 72 in the rim portion 68 of the transducer guide 60 are aligned with the flanges 30, 32 of the mounting base 20 (FIGS. 2–4 and 6). The lower assembly 150 is then pushed upwardly until the rim portion 68 is located above the flanges 30, 32 (FIG. 2). As the lower assembly 150 is moved upwardly, the dry couplant 42 and transducer 40 engage the transition portion 26 of the mounting base 20, compressing the transducer spring 56. Furthermore, the temperature sensor 100 extends through the temperature sensor aperture 34 of the mounting base 20 and engages the exterior surface 18 of the vessel 14. The temperature sensor 100 may be pressed flush with the face 22 of the mounting base by the exterior surface 18 of the vessel, thereby compressing the temperature sensor spring 130.

The lower assembly 150 is then rotated about its central axis such that the notches 70, 72 are no longer aligned with the flanges 30, 32. The arcuate shape of the temperature sensor aperture 34 accommodates the rotation of the temperature sensor 100 within the temperature sensor aperture as the lower assembly 150 is rotated relative the mounting base. At this point, the installer may release the lower assembly 150, as the lower assembly is loosely coupled to the mounting base. When the lower assembly 150 is released, the rim portion 68 of the transducer guide 60 engages the flanges 30, 32 of the mounting base 20, which prevents the lower assembly 150 from becoming uncoupled from the mounting base.

Next, a clamp 140 having a generally "V"-shaped profile is located around the mounting flange 28 of the mounting base and the mounting flange 63 of the transducer guide 60 (see FIG. 2). The clamp 140 may take a variety of shapes, and in one embodiment is a 8400 Series V-Retainer Coupling sold by Voss Industries of Cleveland, Ohio. The clamp 140 holds the mounting base 20 and transducer guide 60 in close, locking engagement. Various other attachment mechanisms, such as screws, clamps, and the like, may be used in place of the clamp 140. The mounting flange 63 of the transducer guide 60 includes an annular slot 142 to receive an O-ring 144 to form a seal between the transducer guide 60 and the mounting base 20.

The temporary mounting feature provided by the flanges 30, 32 and notches 70, 72 provide a "quick attach" feature to couple the lower assembly 150 to the mounting base 20 and hold them in place while the worker attaches the clamp 140. Of course, various other arrangements may be used to temporarily couple the lower assembly 150 to the mounting base. For example, the notches 70, 72 may be located on the mounting base 20 and the flanges 30, 32 may be located on the transducer guide 60. Furthermore, the lower assembly 150 can be coupled to the mounting base 20 by using an O-ring that is received, in an interference fit, in a set of corresponding grooves in the mounting base 20 and the transducer guide 60. The lower assembly 150 can also be coupled to the mounting base 20 by spring loaded tabs, a bayonet locking mechanism, or various other coupling mechanisms.

The sensor 10 of the present invention is easily uncoupled from the vessel 14 should any component of the sensor (such as the transducer 40) require replacement or servicing. To uncouple the sensor 10 from the vessel 14, the clamp 140 is removed, and the transducer guide 60 is rotated until its notches 70, 72 are aligned with the flanges 30, 32 of the mounting base 20. The transducer guide 60 (and lower assembly 150) may then be lowered away from the mounting base 20, and the components of the sensor 10 may be serviced or replaced. Because the dry couplant is not a liquid or gel, it does not need to be contained within a compartment or other structure in the sensor 10, and will not leak when the sensor 10 is uncoupled from the vessel 14.

The mounting base 20 is preferably permanently attached to the vessel 14. Because the mounting base 20 does not have any moving or electrical parts, the mounting base 20 will rarely need to be replaced, and most of the components of the sensor 10 that will need servicing or repair are located in the lower assembly 150 which is easily accessed as described above. Additionally, a number of mounting bases 20 may be located at a variety of locations about the vessel 14. In this manner, the lower assembly 150 of the sensor 10 can be coupled to any one of a number of mounting bases on the vessel. This provides flexibility as to where the fluid level sensor 10 is located on the vessel 14. The thickness of the vessel wall 16 at the location of each mounting base is preferably known and accounted for by the processor 92. This feature may be useful, if, for example, it is expected that there will be obstructions that may necessitate moving the sensor 10, where the obstructions may be located at various, changing locations adjacent the vessel.

Having described the invention in detail and by reference to the preferred embodiments, it will be apparent that modifications and variations thereof are possible without departing from the scope of the invention.

What is claimed is:

1. A sensor for measuring the height of fluid in a vessel comprising:
   a mounting base shaped to be coupled to an exterior surface of a vessel;
   a transducer having a pulse source for sending pulses into said vessel and an echo detector for detecting echoes of pulses emitted by said pulse source;
   a solid couplant located between said transducer and said mounting base and being separable from said transducer and said mounting base; and
   a processor connected to said transducer for calculating the height of fluid in said vessel based at least in part upon the time elapsed between the pulses sent by said transducer and echoes detected by said echo detector.

2. The sensor of claim 1 wherein said couplant transmits pulses from said transducer to said mounting base, and wherein said couplant transmits echoes from said mounting base to said transducer.

3. The sensor of claim 1 wherein said mounting base transmits pulses from said couplant to said exterior surface of said vessel, and wherein said mounting base transmits echoes from said exterior surface to said couplant.

4. The sensor of claim 1 wherein said exterior surface is the outer surface of a wall of said vessel, and wherein said wall transmits pulses from said mounting base to a fluid in said vessel, and wherein said wall transmits echoes from said fluid to said mounting base.

5. The sensor of claim 1 wherein said transducer is spring biased against said couplant.

6. The sensor of claim 5 further comprising a transducer spring and a support, said transducer spring being located between said support and said transducer to bias said transducer against said couplant.

7. The sensor of claim 6 further comprising a transducer guide coupled to said mounting base, said transducer guide having an aperture to closely receive said transducer therein and wherein said support and said transducer guide are integral.

8. The sensor of claim 6 wherein said support is coupled to said mounting base.

9. The sensor of claim 6 wherein said support includes an annular wall adjacent said spring.

10. The sensor of claim 6 further comprising a casing coupled to said support, and wherein said processor includes at least one circuit board located in said casing.

11. The sensor of claim 10 further comprising a port located in an outer surface of said casing, said port being shaped to receive an external plug, and wherein said sensor includes at least one electrical path extending from said circuit board to said port such that an external plug received in said port can be coupled to said at least one electrical path and thereby to said circuit board.

12. The sensor of claim 1 wherein said couplant is spring biased against said mounting base.

13. The sensor of claim 1 wherein said couplant engages a transition portion of said mounting base, and wherein said transition portion has an impedance that is compatible with said couplant and with said exterior surface.

14. The sensor of claim 13 wherein said transition portion is a polymer.

15. The sensor of claim 1 wherein said couplant is an elastomer.

16. The sensor of claim 1 further comprising a transducer guide coupled to said mounting base, said transducer guide having an aperture to closely receive said transducer therein.

17. The sensor of claim 16 wherein said transducer guide is shaped to be removably coupled to said mounting base.

18. The sensor of claim 17 wherein said mounting base includes a pair of flanges, and wherein said transducer guide includes a pair of notches, and wherein said transducer guide can be removably coupled to said mounting base by passing said pair of flanges through said pair of notches and rotating said mounting base and said transducer guide relative each other such that said pair of flanges are not aligned with said pair of notches.

19. The sensor of claim 18 wherein said transducer guide includes a body portion, an axially extending neck portion extending from said body portion, and a radially outwardly extending rim portion coupled to said neck portion, and wherein said notches are formed in said rim portion.

20. The sensor of claim 18 wherein each flange extends generally radially inwardly.

21. The sensor of claim 17 further comprising a clamp for locking said transducer guide and said mounting base together.

22. The sensor of claim 21 wherein said transducer guide has a radially outwardly extending mounting flange and said mounting base has a radially outwardly extending mounting flange, said mounting flanges being located adjacent each other and said clamp being located about said mounting flanges to couple said transducer guide and said mounting base together.

23. The sensor of claim 1 further comprising a temperature sensor thermally coupled to said vessel for sensing the temperature of a fluid, said temperature sensor being electrically coupled to said processor such that said processor can account for the temperature of said fluid when calculating the height of fluid in the vessel.

24. The sensor of claim 23 wherein said mounting base includes a temperature sensor aperture that receives said temperature sensor therethrough.

25. The sensor of claim 24 wherein said temperature sensor aperture is extends generally circumferentially.

26. The sensor of claim 23 wherein said temperature sensor includes a thermocouple connected to a temperature sensor support, said temperature sensor support being a relative thin piece of thermally conductive material.

27. The sensor of claim 23 wherein said temperature sensor is spring biased against said exterior surface of said vessel.

28. The sensor of claim 26 further comprising a transducer guide coupled to said mounting base, said transducer guide having an aperture to closely receive said transducer therein, and wherein said temperature sensor includes a temperature sensor base coupled to said transducer guide, said temperature sensor support being coupled to said temperature sensor base.

29. The sensor of claim 28 wherein said temperature sensor is slidably mounted to said transducer guide, and wherein said sensor further includes a temperature sensor spring located between said temperature sensor base and said transducer guide to bias said temperature sensor against said exterior surface of said vessel.

30. The sensor of claim 29 further comprising a pair of pins coupled to said transducer guide, said pins being received through said temperature sensor base to guide the sliding of said temperature sensor base relative said transducer guide.

31. The sensor of claim 1 wherein said pulse source can emit ultrasonic pulses, and wherein said echo detector can detect an echo that is created when one of said emitted ultrasonic pulses reaches a fluid-gas interface in said vessel.

32. The sensor of claim 1 wherein said mounting base is coupled to said exterior surface of said vessel such that there are generally no air gaps therebetween.

33. The sensor of claim 1 wherein said echo detector is generally sonically isolated from said pulse source.

34. The sensor of claim 33 wherein said echo detector includes a piezoelectric element and wherein said pulse source includes a separate piezoelectric element.

35. The sensor of claim 1 wherein said mounting base is coupled to said exterior surface of said vessel, and wherein said sensor includes an auxiliary mounting base coupled to said exterior surface of said vessel and spaced apart from said mounting base, and wherein said transducer, said couplant, and said processor can be coupled to either said mounting base or said auxiliary mounting base to measure the height of said fluid in said vessel.

36. A sensor for measuring the height of fluid in a vessel comprising:
   a mounting base shaped to be coupled to an exterior surface of a vessel;
   a transducer having a pulse source generator and an echo detector;
   a solid, non-adhesive couplant located between said transducer and said mounting base, said transducer being biased against said couplant; and
   a processor connected to said transducer for calculating the height of fluid in said vessel based at least in part upon the time elapsed between pulses sent by said transducer and echoes detected by said echo detector.

37. A sensor for measuring the height of fluid in a vessel comprising:
   a mounting base shaped to be coupled to an exterior surface of a vessel; and
   a lower assembly that is removably attachable to said mounting base, said lower assembly including a transducer having a pulse source for sending pulses into said vessel and an echo detector for detecting echoes of pulses emitted by said pulse source, a solid couplant located between said transducer and said mounting base, said couplant being separable from said transducer and said mounting base, and a processor connected to said transducer for calculating the height of fluid in said vessel based at least in part upon the time elapsed between the pulses sent by said transducer and echoes detected by said echo detector.

38. The sensor of claim 37 wherein said lower assembly includes a mounting flange and said mounting base includes a mounting flange that is located adjacent said mounting flange of said lower assembly when said lower assembly is removably attached to said mounting base, and wherein said sensor further includes a clamp located about said mounting flanges to couple said lower assembly and said mounting base together.

39. The sensor of claim 37 wherein said lower assembly is shaped to be removably coupled to said mounting base.

40. A method for measuring the height of fluid in a vessel comprising the steps of:
   attaching a mounting base to an exterior surface of a vessel;
   selecting a solid, non-adhesive couplant;
   coupling a transducer to said mounting base such that said couplant is located between said mounting base and said transducer;
   causing said transducer to send a pulse through said mounting base and into said vessel;
   detecting an echo pulse that is created when said pulse reaches a fluid-gas interface in said vessel;
   determining the time elapsed between the sending of said pulse and the detection of said echo pulse; and
   calculating the height of fluid in said vessel based at least in part upon the determination of the time elapsed between the sending of said pulse and the detection of said echo pulse.

41. The sensor of claim 1 wherein said mounting base is made of a material that has an impedance that is compatible with said couplant and said exterior surface.

42. The sensor of claim 1 wherein said mounting base receives a piece of transition material therein, and wherein said transition material has an impedance that is compatible with said couplant and said exterior surface, and wherein said couplant engages said piece of transition material.

43. A sensor for measuring the height of fluid in a vessel comprising:
   a mounting base shaped to be coupled to an exterior surface of a vessel;
   a transducer having a pulse source for sending pulses into said vessel and an echo detector for detecting echoes of pulses emitted by said pulse source, said transducer being connectable to a processor that can track the pulses sent by said transducer and echoes detected by said echo detector; and
   a solid couplant located between said transducer and said mounting base and being separable from said transducer and said mounting-base.

* * * * *